Feb. 2, 1932.  W. C. STARKEY ET AL  1,843,145
ANTIREVERSE SAFETY CLUTCH
Filed Oct. 9, 1929
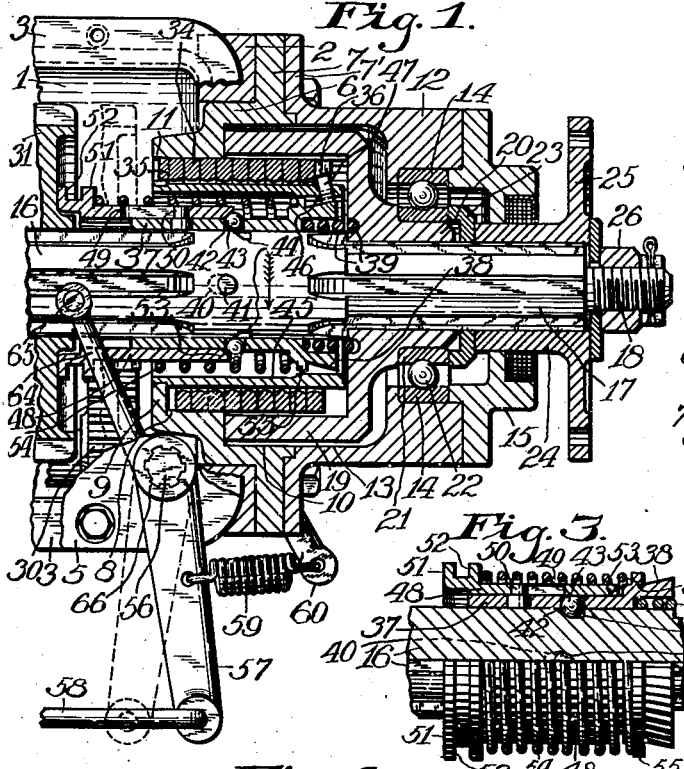
Fig. 1.
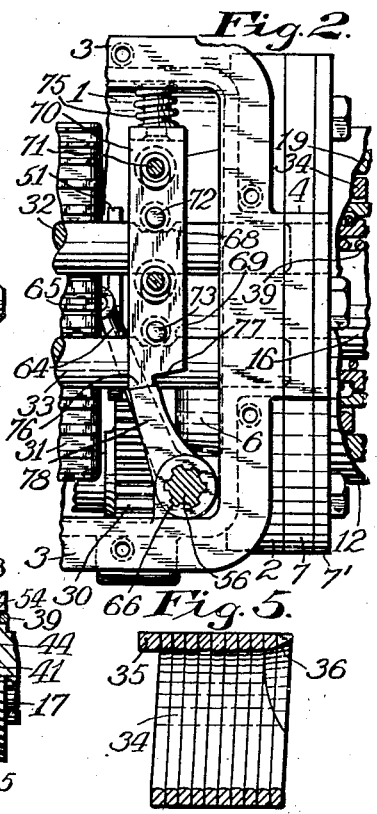
Fig. 2.
Fig. 3.
Fig. 5.
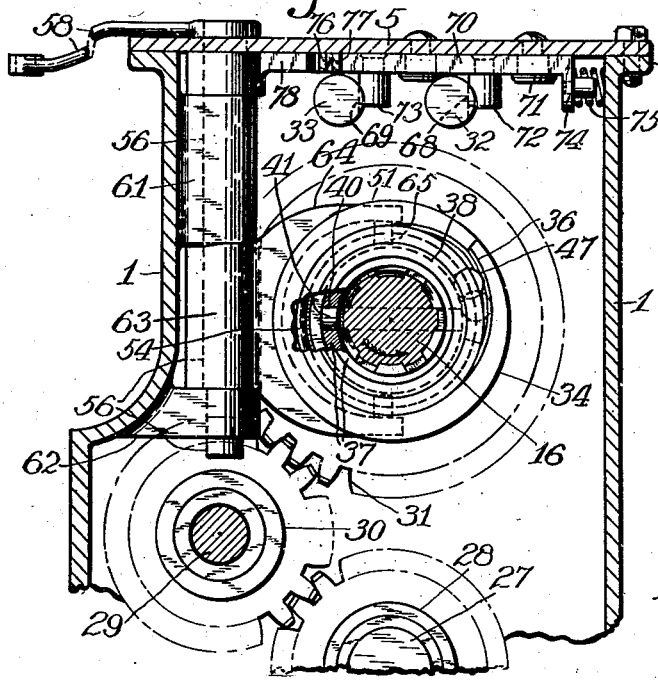
Fig. 4.
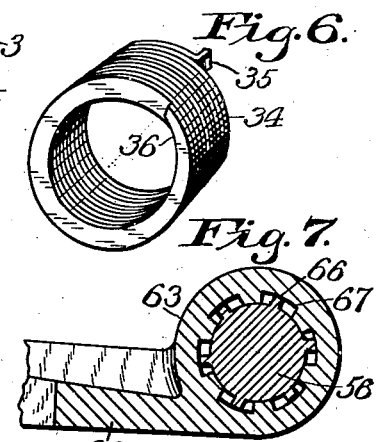
Fig. 6.
Fig. 7.
INVENTORS:
W. C. Starkey
D. T. Brownlee,
By E. T. Silvius
ATTORNEY.

Patented Feb. 2, 1932

1,843,145

UNITED STATES PATENT OFFICE

WILLIAM CARLETON STARKEY AND DALMAR TEMPLETON BROWNLEE, OF INDIANAPOLIS, INDIANA, ASSIGNORS TO L. G. S. DEVICES CORPORATION, OF INDIANAPOLIS, INDIANA, A CORPORATION OF INDIANA

ANTIREVERSE SAFETY CLUTCH

Application filed October 9, 1929. Serial No. 398,349.

This invention relates to an improved safety mechanism for motor-vehicles designed automatically to act and prevent backward or reverse movement thereof when not desired, the invention having reference more particularly to means for controlling the safety mechanism.

An object of the invention is to provide an improved safety clutch or back stop mechanism that shall be so constructed as to reliably operate automatically and prevent reverse or backward movement of a motor-vehicle and which mechanism is controllable to permit intended backward movement.

Another object is to provide an improved safety clutch mechanism that may be so constructed as to require only small effort for control thereof to engage or release, and not be liable to bind or jam when subjected to the most severe operating conditions.

A further object is to provide a safety stop clutch mechanism that shall be of such construction as to be capable of simple and easy controlling operations and not require special skill or training for manipulation or care thereof other than such as is needed for the proper operation of a motor-vehicle.

A further object is to provide an improved safety stop mechanism for motor-vehicles that shall be adapted to reliably prevent backward movement of a motor-vehicle immediately upon the shifting of the transmission gears from the reverse position.

A further object is to provide a back stop mechanism with an improved manually operated clutch releasing device adapted to be put into use only while the motor-vehicle transmission gears are in the neutral position, and to be automatically withdrawn when the gears are shifted into any forward speed position.

A further object is to provide a back stop mechanism of such construction that the various parts shall be simple and permitting rapid manufacture at small cost and yet be capable of operating smoothly and silently under all conditions.

A further object is to provide a back stop mechanism having a minimum friction when in normal running position so as not to wear perceptibly during the ordinary period of usage of the motor-vehicle, and shall not be liable to become overheated at high speed, and which shall be readily adaptable to be used in connection with speed changing transmission apparatus of motor-vehicles as commonly constructed.

A still further object is to provide an antireverse safety clutch mechanism that shall be of such construction as to automatically release with the backward movement of the reverse sliding gear when moving into reverse position, and that shall remain released until the sliding gear is moved forward and out of engagement with the reverse idler of the conventional transmission gear set.

With the above-mentioned and other objects in view, the invention consists in novel structural features in clutching mechanism and novel controlling apparatus therefor, enabling the mechanism automatically to stop unintentional reverse movement of a shaft, and novel controlling means for permitting intentional reverse movement of the shaft; and also further, the invention consists in the novel application of a spring clutch device and the novel parts and combinations and arrangements of parts for the control thereof, as hereinafter particularly described and further defined in the appended claims.

Referring to the accompanying drawings,—Figure 1 is a longitudinal horizontal central section of the improved anti-reverse clutch apparatus in connection with a conventional motor-vehicle transmission set fragmentarily illustrated; Fig. 2 is a fragmentary top plan showing parts of the invention that are structurally higher than the plane on which the preceding view is taken; Fig. 3 is a detail view showing the assembly of closely associated parts of the controlling apparatus; Fig. 4 is a fragmentary transverse vertical section of the transmission gear set and controlling apparatus connected therewith; Fig. 5 is a longitudinal central section of an improved spring clutch embodied in the invention; Fig. 6 is a perspective view of the clutch device; and Fig. 7 is a horizontal section of associated parts of the controlling apparatus.

Similar reference characters in the different figures of the drawings indicate corresponding elements or features of construction herein referred to in detail.

As preferably constructed the invention is hereinafter particularly described as being in connection with a motor-vehicle speed changing transmission set, although having a wider range of applicaiton and usefulness; but the invention and its functions may most readily be understood as being in connection with a well-known type of transmission gearing, so that only a portion of the latter is sufficient to an understanding thereof. The transmission gear set includes a casing comprising a body portion 1 having a rear end 2 and a top flange 3 provided with a projection 4 to partially support conventional shifter rods, a cover 5 being detachably secured to the top flange. The back end 2 has a suitable opening therein into which an annular head box 6 is inserted and having a flange 7 secured to the end 2, the box having a bore 8 that is diametrically larger than the internal diameter of the inner end portion of the box so as to have an inward extending annular bottom portion 9. The box has also a relatively large clearance counterbore 10, and the bottom portion 8 has a pocket 11 therein. A front part 12 is provided which has a flange 7' that is directly secured to the flange 7, and it has a counterbore 13 corresponding in diameter to the counterbore 10. A bearing ring 14 is arranged in the front part 12 and held in place by a cap member 15 secured to the part. The parts 6, 12 and 15 comprise a housing in connection with the transmission gear casing through which the drive shaft of the engine or motor extends, the shaft comprising a main portion 16 and a relatively small end portion 17 having a screw-threaded extension 18. An annular clutch member 19 is arranged loosely in the counterbores 10 and 13 and has a hub portion 20 that is secured to the smaller shaft portion 17. A bearing ring 21 is arranged on the hub portion, and bearing balls 22 are arranged between the rings 14 and 21. The inner bearing ring is secured in place by means of a collar 23 on the shaft and also the hub portion 24 of a coupling flange 25 keyed to the end portion of the shaft, and a nut 26 on the extension 18, the flange being adapted for suitably coupling a propeller shaft to the drive shaft.

The conventional transmission gear set includes a countershaft 27 on which a reverse gear 28 and also speed changing gears are arranged; also an idler shaft 29 and an idler gear 30 thereon meshing with the reverse gear 28. The main portion 16 of the drive shaft has the conventional sliding gear 31 thereon suitably controlled by conventional means including shifter rods 32 and 33, the gear 31 being shiftable into connection with the idler wheel or pinion 30 to accomplish reverse movement of the drive shaft and consequently the motor-vehicle driven thereby.

A coil spring clutch device 34 of improved construction has a lug 35 on one end thereof and the opposite end has an inclined eccentric face 36 on its inner side that is provided as a means for diametrically expanding the clutch coil against the clutch member 19 in which the device is arranged to operate in connection therewith, a number of coils being tightly arranged in the bore 8 and the lug 35 anchored in the pocket 11.

For control of the clutch device two associated sleeves are provided which comprise an inner sleeve 37 that is arranged on the main portion 16 of the shaft and has a head portion on one end that is arranged within the expansible portion of the spring clutch and has a cone or track face 38 thereon which is laterally inclined opposite to the inclined portion 36 in the clutch device. A compression or impelling spring 39 is arranged on the shaft and seated on the hub 20 and in a suitable recess in the head portion of the sleeve to hold the sleeve in operative position, the wall of the sleeve having a short slot 40 receiving a pin 41 that is secured to the shaft to limit the movement of the sleeve that is caused by the spring, and to cause rotation of the sleeve with the shaft. The sleeve has also an aperture 42 therein receiving a ball 43 that is of such diameter as to protrude from the aperture a distance sufficiently great to afford contact to push the sleeve in opposition to the compression spring, the shaft having a sloping pocket 44 to receive a portion of the ball so that protrusion of the ball is discontinued following slight movement of the sleeve. The housing part 6 is provided with a roller-container 45 which is preferably tubular in form and secured at one end to the bottom portion 9 from which it projects within the clutch device 34 nearly to the hub 20 and has a guide slot 46 therein in which a roller 47 is guided so as to roll on the track 38 to contact with the inclined face 36. An outer sleeve 48 is arranged to slide on the exterior of the inner sleeve and it has a longitudinal slot 49 therein receiving a stud 50 secured to the inner sleeve. One end of the outer sleeve has a head portion 51 in which is an annular groove 52, and the opposite end has a beveled end face 53 adapted to have controlling contact with the ball 43 to push the ball into the pocket 44 following slight movement of the inner sleeve. A coil retracting spring 54 is arranged against the back of the head of the inner sleeve and against the head 51 of the outer sleeve so as to push the outer sleeve towards the gear 31 and permit the inner sleeve impelled by the spring 39 to push the ball 43 from the pocket 44. Preferably the head portion of the inner sleeve is provided with a collar 55 on which to correctly seat the spring 54. In this respect, it is pointed out that the spring 54 is much weaker in its action than is the spring 39.

In order to manually release the clutch when desired, a shaft 56 is suitably arranged in the transmission gear casing and is provided on its top with a lever arm 57 to which an operating rod 58 is connected, a retracting spring 59 being connected to the arm and to an ear 60 fixed to the gear housing. The rod 58 may be extended to any desired point conveniently accessible to the motor-vehicle operator. Preferably the wall 1 of the casing has bearing members 61 and 62 fixed thereto between which a shifter fork head 63 is connected to the shaft 56 and has fingers 64 provided with pins 65 extending into the groove 52 to shift the outer sleeve 48. The shaft has splines 66 fixed thereto that are received in suitably broad key ways 67 permitting slight movement of the shaft in one direction without moving the fork head; or movement of the fork by the gear 31 without moving the shaft.

Improved latching apparatus is provided, and for assisting in controlling thereof the shifter rods 32 and 33 are provided respectively with notches 68 and 69 in corresponding sides thereof. A latch bar 70 is arranged under the cover 5 and supported to slide longitudinally by suitable guides 71 on the under side of the cover, the latch bar being provided with pins 72 and 73 that are held in the notches 68 and 69 respectively by spring pressure, the latch bar having an abutment 74 on one end against which a coil spring 75 is seated and in engagement with the wall 1 of the casing. The opposite end of the latch bar has a projection 76 and an adjacent recessed portion 77, and a pawl 78 is secured to the shaft 56 and extends into contact with the projection 76. The arrangement is such that the end of the pawl acts as a cam against the projection so as to move the latch bar and permit the end of the pawl to move into the recess and become caught against the projection so as to prevent return of the pawl until one or the other of the shifter rods is moved so as to force the latch bar back against the pressure of the spring 75 so as to release the pawl to be moved back by action of the spring 59.

In practical use, assuming the invention is applied to a motor-vehicle, the drive shaft rotates in the direction indicated by the arrow thereon in Figs. 1 and 4 to impart forward motion, the gear wheel 31 being shifted out of contact with the reverse idler 30 and not opposing the action of the springs 39 and 54, so that the track 38 is properly placed to support the roller 47 and cause it to roll opposite to the thinner end of the spring coil that has the inclination 36 therein, the clutch device 34 being free from clutching contact with the clutch member 19. Upon stoppage of the motor-vehicle when ascending a hill, in case slight backward movement of the motor-vehicle occurs the roller 47 immediately rolls in the opposite direction and up the inclination 36, causing expansion of the spring clutch 34 into rigid engagement with the clutch member 19 which stops rotation of the shaft in its housing and consequently arrests backward movement of the motor-vehicle. When it is desired to drive the motor-vehicle backward the movement of the gear 31 into connection with the reverse idler causes the outer sleeve 48 to be moved so as to instantly release the clutch because of instant operation on the balls 43 that causes sufficient movement of the inner sleeve to shift the track 38 and relieve pressure on the roller 47, the spring clutch being released in advance of connection of the reverse gears so that shock and strain of the parts are prevented, the balls 43 being pushed into their pockets by the outer sleeve which passes over the balls and permits further movement as the gear 31 goes into mesh with the reverse idler.

In order to permit the motor-vehicle to be pushed backward after having been stopped when parking or in a garage the rod 58 is moved and causes operation of the sleeves and release of the clutch in the same manner as when done by the shifting of the gear 31 into reverse position. The latch and pawl holds the clutch device released so long as the shifter rods are in neutral position. The spring 59 acts to set the clutch device to operative condition when either one of the shifter rods is shifted from neutral position.

What is claimed is:

1. Anti-reverse mechanism having an operable clutch spring and a controllable roller to energize the spring, a rotary drive shaft having a clutch member, and means actuated by the shaft to cause the roller to energize the clutch spring to connect it with the clutch member.

2. Anti-reverse mechanism having an operable annular friction clutch spring provided with an inclined face, a roller adapted to operate on the inclined face for energizing and changing the diameter of the clutch spring, a drive shaft, and means operated by the shaft to control operation of the roller.

3. Anti-reverse mechanism having an operable clutch spring and controlling means therefor including operable co-operating inner and outer sleeves, an energizing roller for said spring actuated by the inner sleeve and a rotary drive shaft carrying the sleeves and provided with a clutch member to be engaged by the clutch spring when energized by the roller.

4. Anti-reverse mechanism having a coil clutch spring and a controlled roller operating at one end of the spring to change the diameter thereof, the opposite end of the spring being anchored, a drive shaft normally rotative in one direction and provided with an annular clutch member and means actuated by said shaft when rotating in the other direction for causing said roller to energize said spring to grip against said annular clutch member.

5. Anti-reverse mechanism having an operable annular clutch spring and an anchorage for one end thereof, a drive shaft having a cone track shiftable thereon, means to shift the track, an annular clutch member on the shaft, and a roller on the track to operate in the opposite end of the clutch spring to expand it into engagement with the clutch member.

6. Anti-reverse mechanism having an operable clutch device and telescoping controlling sleeves therefor provided with interconnecting controlling devices including a shifting ball, and a rotary drive shaft carrying the sleeves and having a pocket to receive a portion of the ball for co-action with the sleeves, the shaft being provided with a clutch member to be engaged by the clutch device.

7. Anti-reverse mechanism having an inner sleeve and an outer sleeve movable thereon, a rotary drive shaft directly carrying the inner sleeve, shiftable means controlled by and enabling the outer sleeve to move the inner sleeve in one direction, a compression spring operating on the inner sleeve to move it in the opposite direction, a relatively weaker spring operating on the outer sleeve to move it in said opposite direction, and clutch apparatus controlled by the inner sleeve to stop reverse movement of the shaft.

8. Anti-reverse mechanism including a drive shaft provided in one side with a shallow pocket, an inner sleeve arranged to longitudinally slide on the shaft and having an aperture in its wall affording an opening to the pocket, clutch apparatus controlled by action of the inner sleeve, a ball operative in said aperture directly to move the sleeve in one direction, a compression spring operating on the sleeve to move it in the opposite direction and thereby push the ball out of said pocket, and an outer sleeve operative on the inner sleeve and having a beveled inner edge to push the ball and thereby move the inner sleeve and later push the ball into the pocket, the outer sleeve being adapted to advance and retain the ball in the pocket to arrest action of the spring, and a relatively weaker spring seated on the sleeves to retract the outer sleeve.

9. Anti-reverse mechanism including a drive shaft, an inner sleeve arranged to longitudinally slide on the shaft and having a longitudinal slot in its wall, a pin fixed to the shaft and extending into said slot, clutch apparatus controlled by action of the inner sleeve, an impelling spring for the inner sleeve to effect clutch action, an outer sleeve operative on the inner sleeve and having a head for its control, a shifting device operating to enable the outer sleeve to retract and hold the inner sleeve and alternatively to be retracted by the inner sleeve upon retraction of the outer sleeve, a retracting-spring operating on the head of the outer sleeve, a controlling lever arm having connection with said head and provided with a retracting-spring, and a controlled latch operating through means of the lever arm and the outer sleeve to arrest action of the impelling spring.

10. In anti-reverse mechanism, the combination, with a rotary transmission shaft and a housing therefor, of an operable clutching spring to fasten the shaft to the housing, and controlling means for the spring including a plurality of co-operating sleeves on the shaft, one of the sleeves having a cone thereon at one end and the remaining sleeve having a controlling head at the other end, said means including also a guided roller operating on the cone in the rotation of said shaft in one direction to cause the energizing of the spring and the clutching of the same upon said housing.

11. In anti-reverse mechanism, the combination, with a rotary transmission shaft and a housing therefor, of an operable clutching apparatus to fasten the shaft to the housing, an inner sleeve movable on the shaft with means directly to operate and control the clutching apparatus, an outer sleeve movable on the inner sleeve and having a control head thereon, controlling connecting means coacting with the sleeves and the shaft, a clutch-releasing device operating on said control head, and a latch indirectly controlling the sleeves to hold the clutching apparatus in inoperative position.

12. In anti-reverse mechanism, the combination, with a housing, of a transmission shaft having a pocket in its side, an inner sleeve movable on the shaft and having an aperture affording an entrance to the pocket, a ball in said aperture and shiftable partially into or wholly out of said pocket to protrude from said aperture, an outer sleeve movable on the inner sleeve and having a beveled end to engage and push the ball, and means to clutch the shaft to the housing controlled in part by the inner sleeve.

13. In anti-reverse mechanism, the combination, with an inclosing housing, of a drive shaft rotatable in the housing, clutching apparatus to fasten the shaft to the housing including an inner sleeve shiftable on the shaft and normally positioned to assist in clutching action, an outer sleeve shiftable on the inner sleeve and having a control head to be moved in one direction by a shiftable gear and its shifter rod, a shiftable device coacting with the sleeves to enable the outer sleeve to move the inner sleeve to effect un-clutching and self-locking actions, and latching means having support on the housing and in connection with said head and automatically controlled to hold the outer sleeve to permit movement of the shiftable gear clearly therefrom.

14. In anti-reverse mechanism, the combination, with a housing and a drive shaft therein, of a lever shaft rotatably supported by the housing and having an operating-arm fixed thereto, a clutching apparatus to fasten the drive shaft to the housing, a plurality of co-operating sleeves operable on the drive shaft and controlling the clutching apparatus, one of the sleeves having a control head, a fork head keyed loosely to the lever shaft and having fingers co-acting with said control head, a latch bar movably mounted in the housing and automatically controlled, and a pawl secured to the lever shaft and shiftably engaging the latch bar to be held thereby.

15. In anti-reverse mechanism, the combination, with a housing and a rotary drive shaft therein, of friction clutch apparatus having connection with the housing and operable to clutch the shaft to the housing, the apparatus including a tapered control device, a cylindrical retaining member fixed at one end to the housing and having a roller-guide adjacent to the opposite end thereof, an inner sleeve movable on the drive shaft and having a cone track, a roller arranged on said track and guided by said roller-guide to co-operate with the tapered control device for controlling operation of the clutch apparatus, and means including an outer sleeve and a shiftable connecting ball operating for intercontrol of the sleeves.

16. In anti-reverse mechanism, the combination, with a housing and notched shifter rods supported in the housing, of a rotary drive shaft in the housing, clutch apparatus to fasten the shaft to the housing, an inner clutch-controlling sleeve controllable on the drive shaft, an outer sleeve to control the inner sleeve, a lever shaft supported by the housing and having a fork thereon to control the outer sleeve, a latch bar supported by the housing and having a projection on one end thereof, the rod having also pins to enter the shifter rod notches, a spring seated on the housing and the opposite end of the latch bar, a pawl secured to the lever shaft and co-acting with the projection on latch bar, and an operating-arm secured to the lever shaft and having a retracting-spring connected thereto.

17. In anti-reverse mechanism, the combination of a rotary drive shaft, a housing for the shaft, clutch mechanism to fasten the shaft to the housing, controlling apparatus for the mechanism including an impelled cone operating to effect clutching action, actuating means operative to restrain operation of the cone including automatically-releasable latching devices coacting with the actuating means.

In testimony whereof, we affix our signatures on the 3rd day of October, 1929.

WILLIAM CARLETON STARKEY.
DALMAR TEMPLETON BROWNLEE.